Dec. 16, 1969     B. A. COLE     3,484,842

METHOD OF MAKING CAPACITORS

Filed Oct. 18, 1967

BERNARD ARTHUR COLE
*INVENTOR*

ATTORNEYS

United States Patent Office 3,484,842
Patented Dec. 16, 1969

3,484,842
METHOD OF MAKING CAPACITORS
Bernard Arthur Cole, Great Yarmouth, England, assignor to Erie Technological Products Limited, South Denes, Great Yarmouth, Norfolk, England, a British company
Filed Oct. 18, 1967, Ser. No. 676,101
Claims priority, application Great Britain, Oct. 19, 1966, 46,858/66
Int. Cl. H01g 13/00
U.S. Cl. 29—25.42                                              6 Claims

ABSTRACT OF THE DISCLOSURE

In making pluggable capacitors using stamped out sheet metal electrodes, metal portions specially left in the stamping operation that bridge the electrodes ends are cut subsequently to provide a spark gap.

---

This invention relates to combination capacitor/spark gap electrical circuit elements, hereafter referred to as spark gap capacitors.

It has already been proposed to apply a bent piece of wire, after the fashion of a hair-pin to a disk capacitor in such a way as to bridge the electrodes, a gap being machined subsequently in the hair-pin bend of the wire to establish a spark gap. In this way the capacitor is protected against transient high voltages.

It is also known to provide what will hereinafter be referred to as pluggable capacitors by stamping metallic terminals as a connected series from sheet metal, the terminals being soldered to capacitor electrodes in such a way that (after severing surplus metal) the resulting terminals on the individual capacitor can be plugged into a circuit board.

I have now found that the process of making a pluggable capacitor can be modified very simply so that the resulting circuit element is at once a pluggable capacitor and a spark gap capacitor.

In accordance with the invention, a pluggable capacitor is made as already described, in such a way that the resulting terminals soldered to the capacitor electrodes are bridged by a part or parts of the metal stampings, a gap being machined in this bridge after the circuit element including the bridge has been dipped in a protective insulating coating material.

In one embodiment of the invention, where the terminals are stamped in such a way that the two terminals of a given capacitor are stamped from the same piece of metal and normally remain connected together until surplus metal is trimmed away, the stamping is so conducted that the resulting terminals are connected together by an additional bridge of metal not interferring with the pluggability of the resu'ting element this bridge being left after the surplus metal has been trimmed away as aforesaid. After the respective terminals have been soldered to the capacitor, in this case generally a disk capacitor, the circuit element (save for the extremities of the pluggable "limbs") is dipped in a protective insulating resinous fluid. After this has set and/or been cured the extraconnecting bridge together with the surrounding resin is sawn or otherwise severed. That is to say a s'ot is cut into the adherent resin and through the remaining branch of metal connecting the terminals.

According to a second embodiment, as normally applied to a tubular ceramic capacitor, where the respective terminals are stamped out in such a way that the terminal for one electrode is part of one strip of connected terminals and the terminal for the other electrode is part of a different strip of connected termina's, the stamping is conducted to leave an extension to the terminals. When the terminals have been positioned, the extensions are bent over substantially into contact with one another so as to become soldered together in the course of soldering the terminals to the tubular capacitor electrodes. Subsequently the procedure is as before; the soldered circuit element is dipped into a protective resin save for those parts required to establish electrical contact at a circuit board after which the bridge is severed by a s!ot cut into the surrounding resin.

The invention will be described further with connection to the accompanying drawings.

Figure 1:
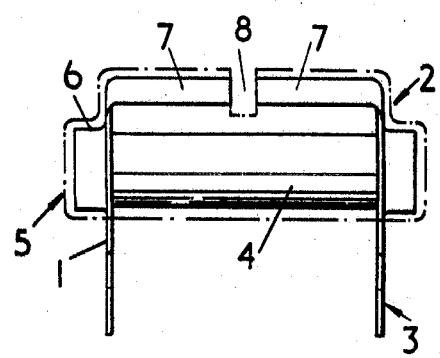
FIGURE 1 is a side view of a tubular spark gap capacitor.
Figure 2:
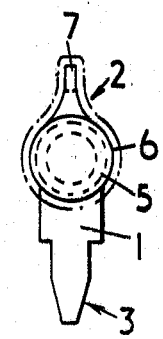
FIGURE 2 is an end view corresponding to FIGURE 1.

Referring first of all to FIGURES 1 and 2, a plurality of blanks are stamped out of sheet metal to provide a succession of individual electrodes 1 joined together in a row by connecting links (not shown) extending sideways from the top (the position generally indicated by the numeral 2) and bottom (the position generally indicated by the numeral 3) of the individual electrodes. To such strips of electrodes are secured the respective ends of tubular ceramic capacitors 4 as shown in FIGURE 1, each electrode of the strip having an opening 5 bordered by an upstanding collar 6 to receive the respective end of the capacitor. The connecting pieces of metal at the bottom position 3 are trimmed away whilst the connecting pieces of metal 7 at the position 2 are severed and bent over at right angles parallel to the respective capacitor 4 so that the respective bent over portions 7 substantially touch each other. The assembly is then subjected to a soldering operation whereby the ends of the capacitor are soldered to their respective collars 6 and the bent metal portions 7 are soldered to one another. After this the assembly is dipped into a body of molten resin and withdrawn to leave all those portions remote from the region 3 embodied in solidified resin. Finally, a slot 8 is machined across the upper part of the resulting body of resin stopping short of the capacitor 4 thereby severing the soldered together metal portions 7 to form the required spark gap. The region 3 of the electrodes is, as heretofore, already formed in the stamping operation so that it is pluggable into a circuit board.

Figure 3:
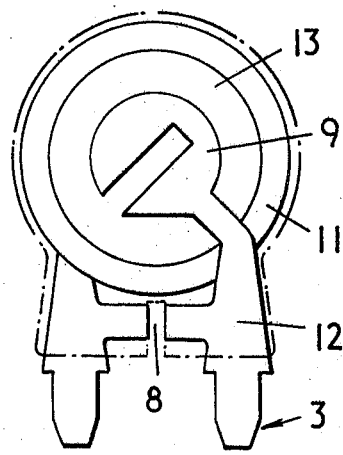
FIGURE 3 is a side view of a disc type spark gap capacitor.
Figure 4:
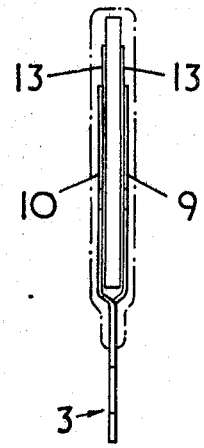
FIGURE 4 is an edge view corresponding to FIGURE 3.

Referring now to FIGURES 3 and 4 an electrode strip is formed in a s'amping operation in accordance with well established techniques to provide a front electrode portion 9 and a rear electrode portion 10 for a disc capacitor 11 joined together by a continuous metal strip (not shown) in the region 3 of the electrodes. The purpose of this strip is simply to hold the electrode portions 9 and 10 together during assembly of the complete circuit element; at a subsequent stage this strip is trimmed away.

In addition to the strip just referred to, the stamping operation is conducted so that the electrode portions 9 and 10 are also joined by a connecting strip 12. As in the well estab:ished technique, the electrode portions 9 and 10 are displaced so that the disc capacitor 11 can be inserted therebetween and the electrode portions are then soldered to the silver electrode areas 13 already provided on the ceramic capacitor. Next the resulting assembly is dipped into molten resin, stopping short of the "pluggable" bottom portions 3, and a slot 8 is machined into the resulting adherent coating of resin to form a spark gap in the connecting strip 12.

In each of the drawings, the dotted outline indicates the approximate contour of the solid resin protective coating.

As will be apparent from the foregoing description, the present invention enables a spark gap to be provided in a capacitor circuit element without any additional step of providing leads after the operation of soldering the electrodes to the pre-formed metallic contacts of the capacitor.

I claim:
1. A method of making a pluggable spark gap capacitor which comprises the steps of stamping sheet metal to provide at least one pair of connected electrodes; providing a capacitor body and metallurgically bonding said electrodes to respective contact areas on said body; forming a layer of protective insulating coating material about said capacitor body and said electrodes including an integral bridging portion connecting said electrodes, but leaving the free ends of said electrodes clear of said coating material; and machining a slot in said insulating coating material on said bridging portion connecting said electrodes so as to sever said connection and form a spark gap.

2. A method as claimed in claim 1 wherein said electrodes are connected by said bridging portion and by a further portion, and comprising the further step of removing said further portion after said bonding step.

3. A method as claimed in claim 2 wherein said capacitor body is a disc; and said insulating coating material is a resinous fluid applied by dipping.

4. A method of making a pluggable spark gap capacitor which comprises the steps of stamping sheet metal to form a first and second electrode body connected together by at least one link; positioning said first and second electrode bodies respectively in contact with respective contact areas of a capacitor body; severing said connecting link to form a tab on each said electrode body; bending the respective tabs substantially into contact one with the other; metallurgically bonding said first and second electrode bodies to said capacitor body contact areas and said bent tabs to one another; forming a layer of protective insulating coating material around both said electrode bodies and said capacitor body, but leaving the free ends of both said electrode bodies clear of said coating material; and machining a slot in said coating material on said soldered-together bent tabs so as to sever them and form a spark gap.

5. A method as claimed in claim 4 wherein said first and second electrode bodies are connected together by two links, and comprising the further step of removing said second link while the first link is severed to form tabs on each said electrode body.

6. A method as claimed in claim 5 wherein said capacitor body is tubular; and said insulating coating material is a resinous fluid applied by dipping.

References Cited

UNITED STATES PATENTS

| | | | |
|---|---|---|---|
| 1,768,430 | 6/1930 | Van Deventer | 317—242 |
| 1,768,441 | 6/1930 | Dubilier | 317—242 |
| 3,042,846 | 7/1962 | Lawson | 317—256 |
| 3,087,093 | 4/1963 | Bourgerie | 317—256 |
| 3,284,683 | 11/1966 | Rieth | 29—25.42 |
| 3,316,467 | 4/1967 | Sperry | 317—242 |

FOREIGN PATENTS 1,295,271  4/1962  France.

PAUL M. COHEN, Primary Examiner

U.S. Cl. X.R.

29—25.13; 317—242, 256